United States Patent
Khosla et al.

(10) Patent No.: US 10,775,247 B1
(45) Date of Patent: Sep. 15, 2020

(54) CAPACITIVE SHIFT-FORCE SENSOR

(71) Applicants: Vishal Khosla, San Jose, CA (US); Nick Doe, San Jose, CA (US); Jun Xiao, San Jose, CA (US); Gautam Char, San Jose, CA (US)

(72) Inventors: Vishal Khosla, San Jose, CA (US); Nick Doe, San Jose, CA (US); Jun Xiao, San Jose, CA (US); Gautam Char, San Jose, CA (US)

( * ) Notice: Subject to any disclaimer, the term of this patent is extended or adjusted under 35 U.S.C. 154(b) by 0 days.

(21) Appl. No.: 16/571,645

(22) Filed: Sep. 16, 2019

(51) Int. Cl.
 *G01L 1/00* (2006.01)
 *G01L 5/00* (2006.01)
 *G01L 1/14* (2006.01)
 *G01N 19/02* (2006.01)

(52) U.S. Cl.
 CPC ............. *G01L 1/144* (2013.01); *G01L 5/00* (2013.01); *G01N 19/02* (2013.01)

(58) Field of Classification Search
 CPC ............ G01L 1/144; G01L 5/00; G01N 19/02
 USPC ...................................................... 73/862.626
 See application file for complete search history.

(56) References Cited

U.S. PATENT DOCUMENTS

| | | | |
|---|---|---|---|
| 4,663,972 A * | 5/1987 | Gerard | G01P 15/02 73/514.21 |
| 4,738,324 A * | 4/1988 | Borchard | G01G 3/08 177/210 C |
| 4,899,600 A | 2/1990 | Lee | |
| 4,999,735 A | 3/1991 | Wilner | |
| 5,461,319 A | 10/1995 | Peters | |
| 5,834,864 A * | 11/1998 | Hesterman | B82Y 35/00 310/40 MM |
| 5,969,270 A * | 10/1999 | Doemes | F16D 65/18 73/780 |
| 2007/0238212 A1* | 10/2007 | Merassi | G01P 15/125 438/48 |
| 2008/0053226 A1* | 3/2008 | Diem | G01C 19/5747 73/504.12 |
| 2011/0219876 A1* | 9/2011 | Kalnitsky | A63F 13/211 73/514.32 |
| 2018/0164339 A1* | 6/2018 | Zwahlen | G01P 15/0802 |
| 2018/0195912 A1 | 7/2018 | Schmidt et al. | |

FOREIGN PATENT DOCUMENTS

DE 19650066 7/1998
EP 0534270 A1 3/1993

* cited by examiner

*Primary Examiner* — Max H Noori

(57) ABSTRACT

The capacitive shift-force sensor is made in the form of a deformable casing defined by two parallel rigid plates spaced from each other and interconnected by two deformable members. The sensor is provided with two capacitors, wherein one capacitor plate of each capacitor is rigidly connected to one rigid plate and the other capacitor plate is rigidly connected to the other rigid plate. In an unloaded state of the sensor, capacitor gaps of both capacitors are equal and the capacitors have the same capacitive characteristics. However, when one of the rigid plates is maintained immobile and the other one is shifter under the effect of an applied shift force, the capacitor gaps of the capacitors, and hence, the capacitive characteristics of the capacitors, change differently, and with the use of a differential amplifier this difference is measured and recalculated into the value of the applied shift force.

15 Claims, 4 Drawing Sheets

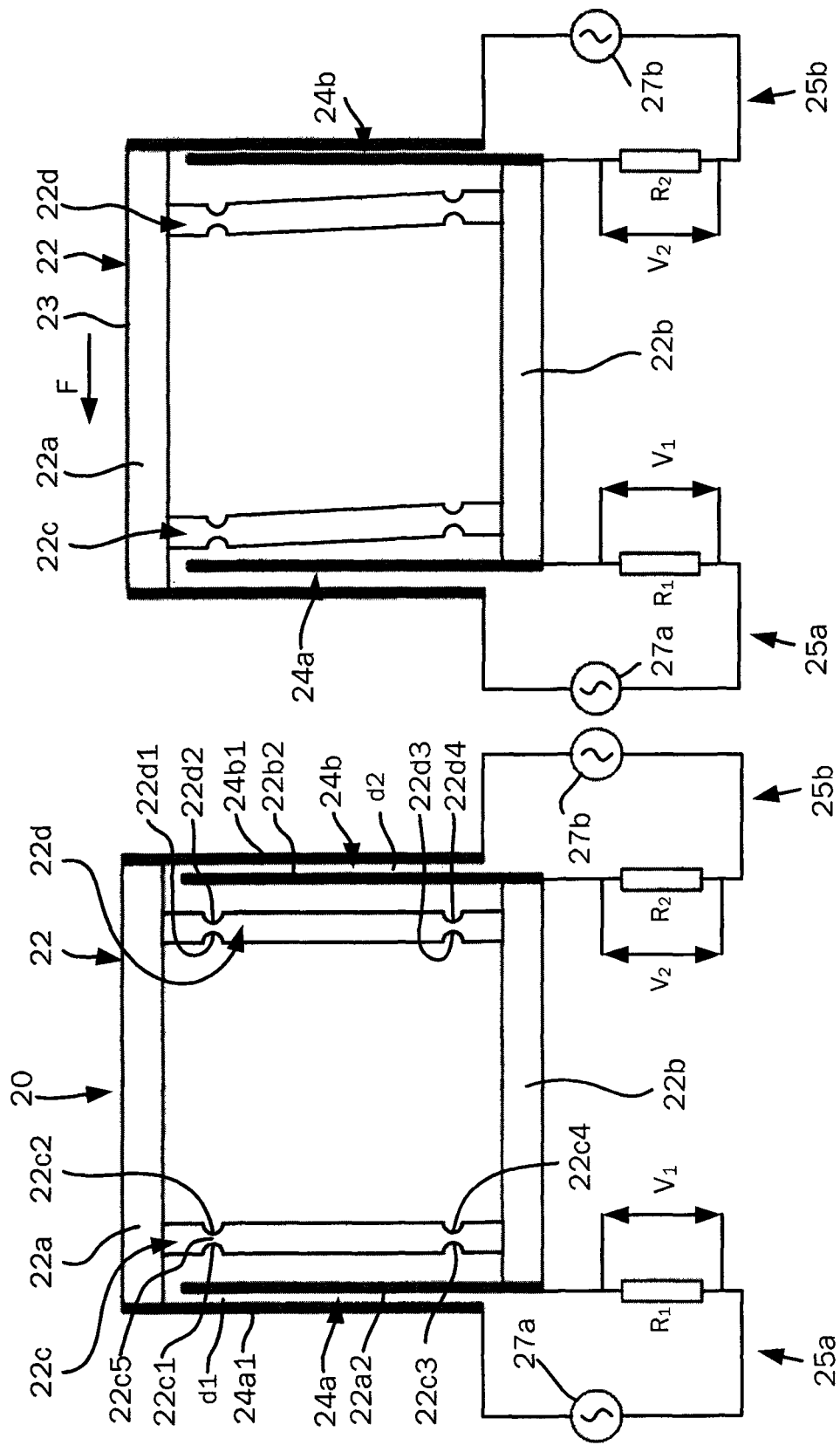

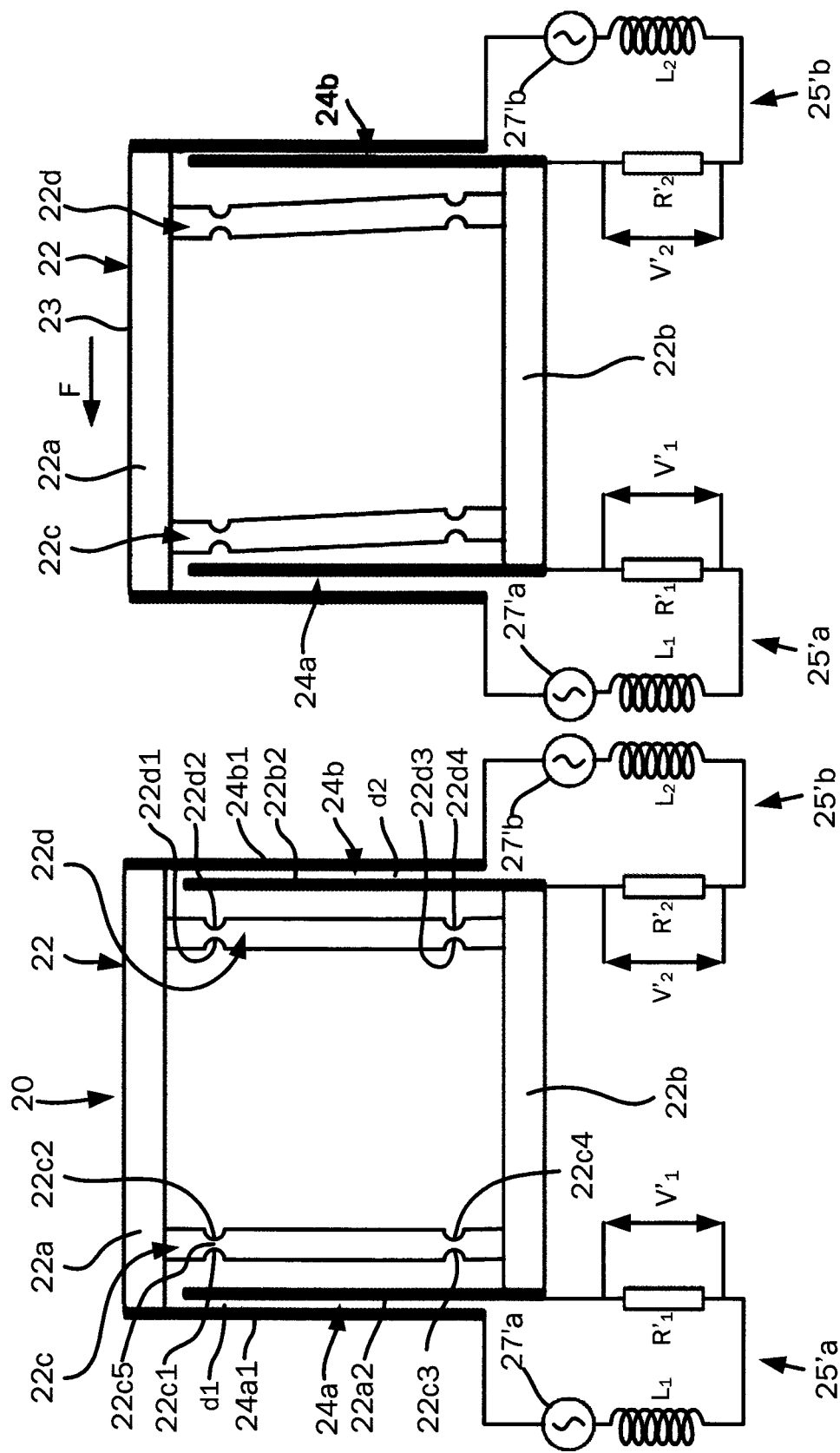

CAPACITIVE SHIFT-FORCE SENSOR

FIELD OF THE INVENTION

The present invention relates to a capacitive force sensor and, more particularly, to a capacitive shift-force sensor having capacitive characteristics changeable under the effect of an applied shift force, the changes being recalculated into the value of the measured force. The sensor of the invention may find use in tribology for measuring, e.g., friction forces, resistance to wear, adhesive strength of a coating on a substrate, etc.

DESCRIPTION OF THE PRIOR ART

Capacitive force sensors of the type where capacitive characteristics are changed under the effect of an applied force and where the changes are recalculated into the value of the force being measured are well known in the art.

For example, U.S. Pat. No. 4,999,735 issued on Mar. 12, 1991 to Bruce Wilner discloses a differential variable capacitance acceleration sensor that includes a sandwich structure having three stacked plates of silicon with the center plate mounted such that its center portion is enables to move in a sealed cavity with each side thereof moving toward and away from a fixed cooperating plate forming the opposite side of a capacitive circuit. The center portion or mass of the center plate is suspended from its rim by means of a large number of integral fingers extending from the rim to the top and bottom surfaces of the center portion. This center mass includes a number of through holes to permit the passage of air from one side to the other and may also include grooves to aid in the flow of air. The fixed top plate or lid and the base also have, or may have, grooves to assist in the passage of air. The integral fingers are formed in sinuous curves or other form varying from straightness but having a significant tension such that when the center mass is displaced during a sensed acceleration, the fingers tend toward straightness. In an alternative embodiment, the fingers are bars having corrugations stepped between different planes.

European Patent Application Publication No. EP 0534270A1 issued on 31 Mar. 1993 (Inventors: Bernhard Beetz, et al.) discloses a force transducer, in particular a load cell, having a force-introducing part, a deforming part, and a supporting part, in which mechanical deformations are converted into an electrically measurable change in capacitance by means of a capacitive measuring transducer, which has two mutually parallel adjustable electrode structures. Each of these structures comprises electrodes in a comb-shaped arrangement and engages in each other, so that the overall capacitance of the measuring transducer results from a parallel connection of pairs of electrodes. The invention is used in the case of handling equipment and in weighing technology. The capacitance is changed due to parallel relative displacements of capacitor plates caused by deformations under the effect of the applied force.

U.S. Pat. No. 5,461,319 issued on Oct. 24, 1995 to Randall Peters discloses a symmetric differential capacitance transducer employing cross-coupled conductive plates to form equipotential pairs. The symmetry of this transducer is maintained in the presence of capacitance change induced by motion. Consequently, there is greater immunity to extraneous stray capacitances, thus greater sensitivity and range of linearity. Sensitivity is further increased by means of synchronous detection at the output. The pair of capacitances may be part of a bridge circuit, if desired. A bridge excitation source applies a suitable AC voltage across the equipotential pairs of static plates, which are not electrically common, by means of conductors, which are connected to the pair of moving plates and to a differential amplifier.

German Patent Application Publication No. 19650066 issued on Jul. 4, 1998 (inventors: Markus Guldner, et al). The sensor consists of one chamber to receive the pressure to be measured and another chamber as a reference. Between these is a reversible moldable separating wall, which is shaped by the pressure applied. A cylindrical piston is coupled mechanically to the wall and responds to its deformation. The movement of the piston is identified by a path receiver in the form of a capacitance bridge for alternating current consisting of two plates. The first plate is a pair with a gap between, set in the pressure sensor housing, and the second is mounted on the positioning cylinder so that it moves between them. The flowing current, which is determined by an evaluation unit, corresponds to the differential, relative, or absolute pressure being measured.

US Patent Application Publication No. 20180195912 issued on Jul. 12, 2018 (Inventors: Schmidt; Benedikt; et al.) discloses a capacitive force sensor that includes a planar base body, a supported membrane body, two spacers disposed spaced apart to each other, where the membrane body abuts the planar base body via the spacers, and wherein a cavity is formed between the membrane body and the planar base body to allow displacement or deflection of the membrane body under a force onto the membrane body in the area between the spacers. The membrane body forms a first electrode and, a second electrode is provided on the planar base body, wherein the first and second electrode define a first precision capacitor with changing measuring capacity depending on the force. An electrical bracket extends from each of the spacers for electrically contacting the first electrode and forms a bend between each of the associated spacer and a bottom of the base body. When a force is applied to the sensor, a measuring capacity of an analyzing unit varies depending on the effect of force and the approach of the membrane body to the planar base body. The force is applied perpendicular to the capacitor plates.

U.S. Pat. No. 4,899,600 granted on Feb. 13, 1990 to Shih Ying Lee discloses a compact force transducer with mechanical motion amplification. The transducer has at least one flexible beam mounted at one or both its ends to a force summing member or members. The force to be measured is applied to the force-summing member along a first axis generally transverse to the beams to deform the beam elastically, without overstressing, through a displacement d. A sensor member carries a conductive surface and is coupled to the beam member. In a parallelogram form, there are a parallel pair of beam members extending between two force-summing members and a sensor member is secured to each beam member at or near its point of inflection. One sensor member includes multiple arms that sandwich the other sensor member to produce a linear, push-pull mode of operation. In a low cost cantilevered beam form, the sensor is coupled to the beam at the force-summing member in a parallel, spaced relationship. In a hybrid push-pull form, the transducer uses a two-beam parallelogram construction with cantilevered sensors coupled rigidly to each beam adjacent one force-summing member with a hinge coupling between the beam and this one force summing member, and extending generally in a parallel spaced relationship with respect to an associated one of the beams. Because the sensors are mounted at the tip of the flexed beam members, where the angular deformation induced by the displacement d is the greatest and the capacitance sensing gap is located at the opposite ends of the beam members, there is a mechanical motion amplification at the sensing gaps of displacement d (the relative motion of the force summing members). Because of the parallelogram structure and the use of two sensors arranged in this manner, the transducer also provides a push-pull mode of operation. In this transducer, the capacitor gap is changed under the direct effect of force applied in the direction perpendicular to the capacitor plates.

SUMMARY OF THE INVENTION

A capacitive force sensor of the present invention is made in the form of a deformable parallelepiped defined by two parallel rigid plates spaced from each other. Each capacitor is formed by a pair of capacitor plates that form respective capacitor gaps. The rigid place are interconnected by a pair of deformable members, which allow plane-parallel displacement of the rigid plates with respect to each other, and hence, the change of the capacitor gaps. One capacitor plate of each capacitor is rigidly connected to one of the rigid plates, and the other capacitor plate is rigidly connected to the other rigid plate. As a result, in stationary condition of the sensor, i.e., when a force is not applied to the sensor, the capacitor gaps of both capacitors are maintained equal and their capacitive characteristics are in balance. However, when a force is applied to one of the rigid plates of the parallelepiped, this one plate is shifted in a plane-parallel motion relative to the other plate, so that the gap of one of the capacitors increases, while the gap of the other capacitor decreases. The misbalance is measured in terms of an electric current and is recalculated into the value of the applied force.

More specifically, a force-measurement sensor of the invention contains a casing formed by a first plate and a second plate spaced from each other. The plates are oriented parallel to each other and interconnected by resiliently deformable members that allow a plane-parallel displacement of the first plate and the second plate relative to each other. The sensor further contains a first capacitor having first capacitive characteristics and consisting of a first pair of capacitor plates forming a first capacitor gap and a second capacitor having second capacitive characteristics and consisting of a second pair of capacitor plates forming a second capacitor gap, wherein one capacitor plate of the first pair and one capacitor plate of the second pair are connected to the first plate of the casing and are arranged perpendicular thereto, and wherein the other capacitor plate of the first pair and the other capacitor plate of the second pair are connected to the second plate of the casing and are arranged perpendicular thereto so that when a force is applied to one of the plates of the casing, first plate and the second plate of the casing are displaced relative to each other, and the magnitudes of the first capacitor gap and the second capacitor gap change differently thus causing changes in values of the capacitive characteristics of the first capacitor and the second capacitor depending on the value of the force applied to the aforementioned one of the plates of the casing.

BRIEF DESCRIPTION OF THE DRAWINGS

FIG. 2 is a side view of the sensor of FIG. 1 in a non-deformed state.

FIG. 3 is a side view of the sensor of FIG. 1 in a state deformed by application of a shift force to the upper rigid plate.

FIG. 6 is a view similar to FIG. 4 with electrical circuitry operating in a resonance mode shown in a simplified form.

FIG. 7 is a schematic view similar to FIG. 5 with electrical circuitry operating in a resonance mode shown in a simplified form.

DETAILED DESCRIPTION OF THE INVENTION

Figure 1:
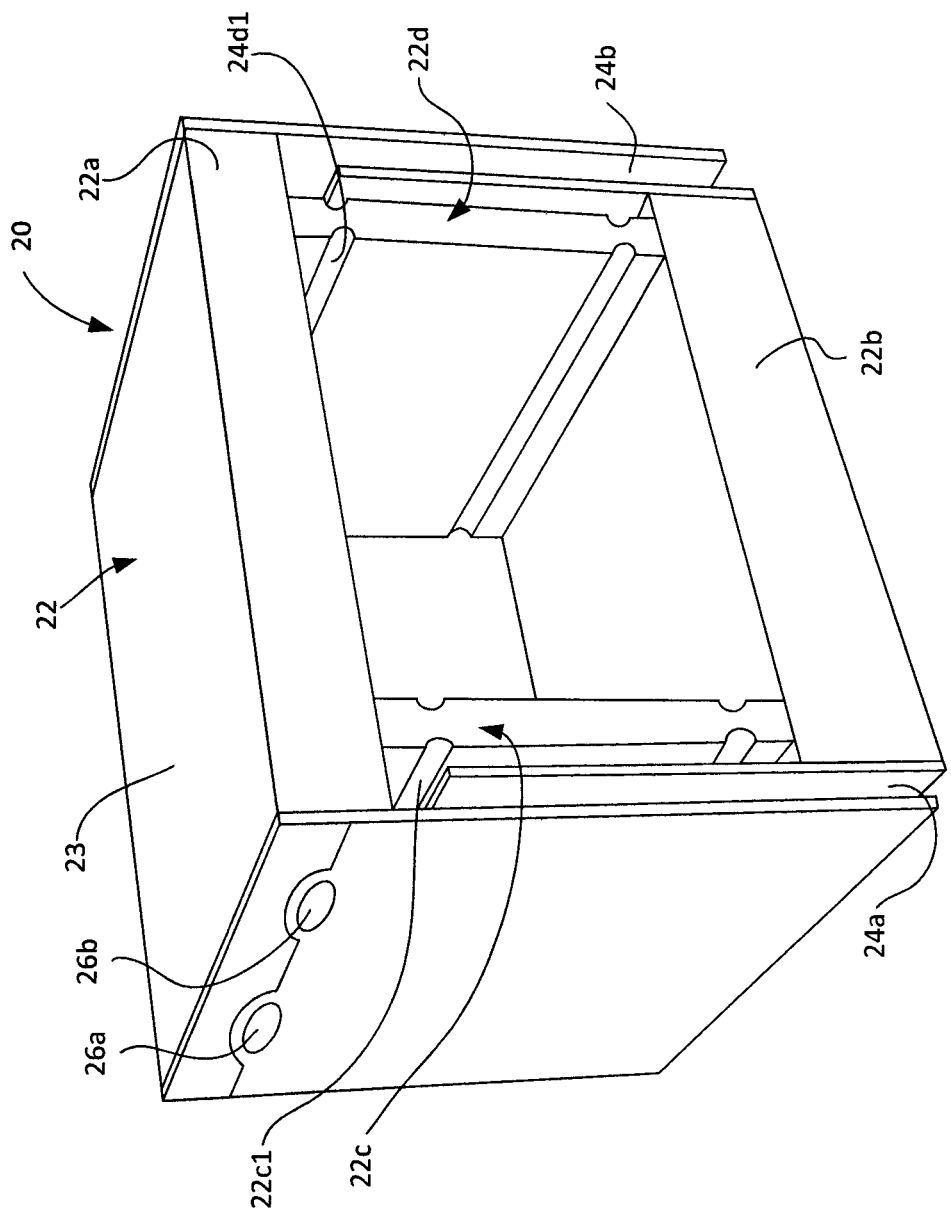
FIG. 1 is a three-dimensional view of the capacitive shift-force measurement sensor of the invention.

The capacitive shift-force sensor of the invention is illustrated by the attached drawings, wherein FIG. 1 is a three-dimensional view of the capacitive shift-force measurement sensor of the invention, FIG. 2 is a side view of the sensor of FIG. 1 in a non-deformed state, and FIG. 3 is a side view of the sensor of FIG. 1 in a state deformed by application of a shift force to the upper rigid plate.

The capacitive shift-force measurement sensor 20 of the invention has a casing 22 formed by two parallel rigid plates 22a and 22b spaced from each other and interconnected at their edges by a pair of deformable members 22c and 22d that extend perpendicular to the rigid plates 22a and 22b. The sensor has a pair of capacitors 24a and 24b. Each capacitor is formed by a pair of capacitor plates 24a1, 22a2 and 24b1, 22b2, respectively with capacitor gaps d1 and d2 formed between the respective plates (FIGS. 2 and 3).

The external plates 24a1 and 24b1 are attached to the edges of the rigid plate 22a, while the inner plates 22a2 and 22b2 are attached the edges of the rigid plate 22b.

Figure 4:
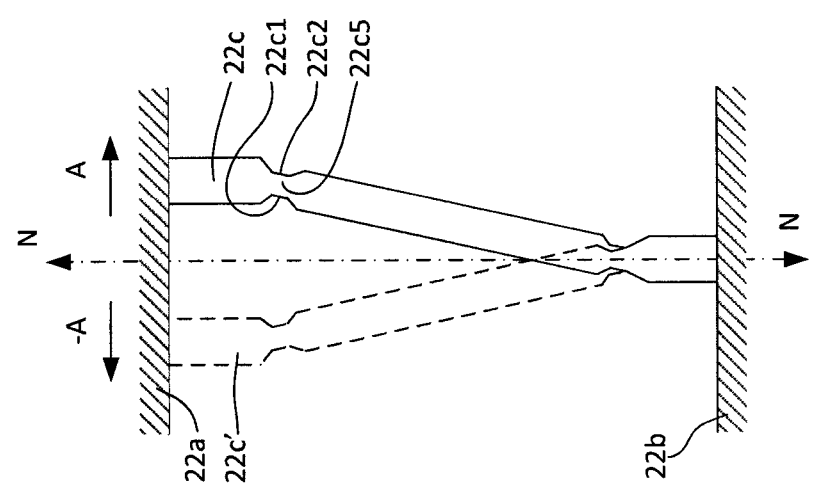
FIG. 4 is a side view illustrating motions of one of the deformable members caused by application of a shift force to the upper rigid plate.

As can be seen from the drawings, each deformable member 22c and 22d is comprised of a rigid plate having thinned portions formed, e.g., by a pair of grooves located opposite each other on opposite sides of the deformable member. The grooves are provided at the top and the bottom of each deformable member. In the drawings, the grooves are designated by reference numerals 22c1, 22c2 and 22c3, 22c4 on the deformable member 22c and by reference numerals 22d1, 22d2 and 22d3, 22d4 on the deformable member 22d. The grooves 22c1, 22c2 and 22c3, 22c4 extend in a direction that allow the rigid plate 22a loaded with a shift force F to perform plane-parallel motions in the direction of the applied shift force F relative to the other rigid plate 22b which is immobile so that, when the capacitor gaps d1 and d2 are changed, the capacitor plates 22a2, 24a1 and 22b2, 24b1 of both capacitors remain parallel to each other. This can be seen from FIGS. 3 and 4, where FIG. 4 is a side view illustrating motions of one of the deformable members caused by application of a shift force F (FIG. 3) to the rigid plate 22a. The depth of the grooves, e.g., grooves 22c1 and 22c2 (FIG. 4) and hence the thicknesses of a thinned portion, such as a 22c5 between these grooves, determine rigidity of the deformable members, such as 22c. On the other hand, the rigidity of the deformable member defines the value of measurable forces, which can be selected in a very wide range. It is understood that by changing the thickness of the aforementioned wall, such as the wall 22c3 in all deformable members, it becomes possible to change the range of measurable forces.

The image shown in FIG. 4 by broken lines shows a position 22c' of the deformable member 22c shifted under the effect of a force acting in the direction shown by the arrow –A. In a condition of no load, the deformable member 22c should assume a neutral position corresponding to the vertical axis N-N. For returning into the neutral position after release from the applied force, the material of the deformable member should possess a sufficient resiliency, and a force should be selected so that the deformation occurs within the limits of the Hooke's law. In other words, the thinned portions of the deformable members will experience only resilient deformations.

The upper rigid plate 22a has a plane 23 parallel to the shift force F, and the grooves 22c1, 22c2 and 22c3, 22c4 are parallel to the plane 23 of the rigid plate 22a but perpendicular to the shift force F.

For simplification of measurements and calculations, it is preferable that in a static state, i.e., when a force is not applied to the casing 22, the gaps d1 and d2 are equal and the capacitors have equal capacitive characteristics.

The capacitors have outlet terminals 26a, 26b (these terminals are present on both sides of the sensor, one for each capacitor but only one pair is shown in FIG. 1), which are connected to a measurement circuit 26 measuring capacitive characteristics of the respective capacitors 24a and 24b. The circuit is working in a non-resonance mode on a frequency in the range of 15 to 25 KHz.

The measurement circuit is a conventional differential amplifier of the type described, e.g., in U.S. Pat. No. 4,227,182 issued on Oct. 7, 1980 to Hiroomi Ogasawara.

When a force F is applied to the plate 22a in the direction indicated by the arrow in FIG. 2, the deformable members 22c and 22d deform, and the plate 22a shifts together with the capacitive plates 24a1 and 24b1 relative to plate 22b and, hence, relative to the capacitor plates 22a2 and 22b2 in a plane-parallel motion. As a result, the capacitor gap d1 increases and the capacitor gap d2 decreases. This action changes capacitive characteristics of the capacitors, and the results of measurements are used for determining the value of the applied force.

Reference numerals 25a and 25b in FIGS. 2 and 3 designate capacitors power supply circuits shown in a simplified form. The circuits contain an AC power generators 27a, 27b and resistors R1 and R2 connected in series with the capacitor plates 24a1, 22a2 and 24b1, 22b2, respectively.

As shown in the drawings, the values to be measured are voltage signals V1 and V2. The resistors R1 and R2 are measurement resistors used for determining the values V1 and V2 as changes of AC voltages caused by changes of capacitive resistances during movements of the capacitors plates toward each other or away from each other.

The force F shown in FIG. 2 is proportional to (V2−V1). For convenience of measurement and improvement in the measurement accuracy, the force F is expressed as a function of F=k(V2−V1)/(V2+V1).

Figure 5:
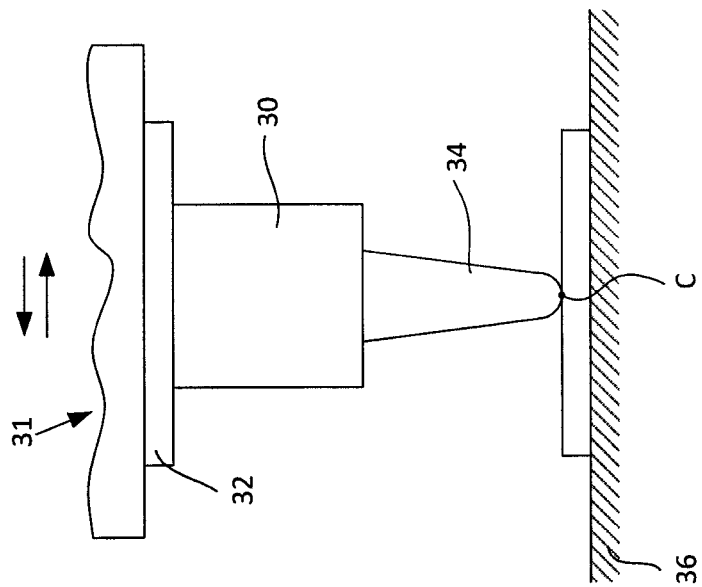
FIG. 5 is a schematic view illustrating application of the sensor of the invention for measuring a friction force on a material tester.

FIG. 5 is a schematic view illustrating application of the sensor of the invention for measuring a friction force on a material tester.

It can be seen that a capacitive shift-force sensor 30 is a part of a material tester 31 for testing a material sample 36. The tester has a reciprocating part 32 and a probe 34 that performs reciprocating motions relative to the material sample 36 in contact with the sample 36. The capacitive shift-force sensor 30 is rigidly installed between the reciprocating part 32 and the probe 34.

The sensor 30 measures, e.g., a friction force, which is developed in contact point C during movement of the probe 34 on the sample 36.

FIGS. 2 and 3 illustrate a modification of the capacitive shift-force sensor equipped with an electrical circuitry operating in a non-resonance mode with frequencies in a specified range. The circuitry shown in FIGS. 6 and 7 illustrate an oscillatory circuit composed of an AC power source 27a', an inductive coil L1, resistor R'$_1$ connected in series with the capacitor 24a. It is understood that the circuitry shown in FIGS. 6 and 7 are conventional and are presented only for explanation of the principle. In reality, the capacitors 24a and 24b can be included into resonance circuitry of other types, including bridge-type AC circuits. In contrast to the circuits of FIGS. 2 and 3, the circuits of FIGS. 6 and 7 allow to measure not only the values of V'$_1$ and V'$_2$ but also the values of resonance frequencies f1$_{res}$ and f2$_{res}$ for circuits 25'a and 25'b, respectively. In FIGS. 6 and 7, the components of the sensor 20 other than the elements of the circuitry remains the same and therefore are designated by the same reference numerals as in FIGS. 2 and 3. For operation in a resonance mode, the AC power sources 27a' and 27"b are generators of variable frequency.

FIGS. 2 and 3 illustrate a modification of the capacitive shift-force sensor equipped with an electrical circuitry operating in a non-resonance mode Although the invention has been described and shown with reference to specific examples illustrated by specific drawings, it is understood that these descriptions and drawings were given only as examples and do not limit the scope of the application of the invention which allow any modifications and changes within the scope of the attached claims. For example, the casing of the sensor may be formed differently, e.g., not from plates but from strips. The deformable members may be embodied in many different ways if they allow plane-parallel motion of the rigid plates and hence changes in the capacitor gap dimensions. The deformable members may be made in the form of a plurality of beams. The electric circuitries were shown conventionally and can be embodied in different ways with series and/or parallel connection of the components.

The invention claimed is:

1. A capacitive shift-force sensor comprising a deformable parallelepiped defined by two parallel rigid plates spaced from each other and by a pair of deformable members that interconnect the two parallel rigid plates and allow plane-parallel shift of the two parallel rigid plates with respect to each other when a shift force is applied to one of the two parallel rigid plates, the force sensor being further provided with two capacitors, wherein each capacitor has its own capacitive characteristics and comprises a pair of capacitor plates that form respective capacitor gaps, one capacitor plate of each capacitor being rigidly connected to one of the rigid plates, and the other capacitor plate being rigidly connected to the other of the two parallel rigid plates, whereby when a shift force is applied to one of the of the two parallel rigid plates, this one plate is shifted in a plane-parallel motion relative to the other of the two parallel rigid plates, so that the gap of one of the capacitors increases, and the gap of the other capacitor decreases, a misbalance caused by the shift in capacitive characteristics of both capacitors being measured in terms of an electric current and recalculated into a value of the applied shift force, each deformable member comprising a member of a predetermined thickness which has two thinned portions, one thinned portion being located on a side of the deformable member close to one of two parallel rigid plates and another thinned portion being formed on a side of the deformable member close to the other of two parallel rigid plates, the thinned portions imparting to said deformable parallelepiped deformability and allowing plane-parallel motions of said one of the two parallel rigid plates to the other of the two parallel rigid plates.

2. The capacitive shift-force sensor according to claim 1, wherein each thinned portion comprises at least one groove formed on a side of the deformable member.

3. The capacitive shift-force sensor according to claim 2, wherein each thinned portion comprises a pair of grooves formed opposite each other on opposite sides of the deformable member.

4. The capacitive shift-force sensor according to claim 3, wherein the grooves have directions that allow plane-parallel movement of one rigid plate relative to the other rigid plate when a shift force is applied to said one rigid plate.

5. The capacitive shift-force sensor according to claim 3, wherein said one rigid plate has a plane parallel to the shift force and wherein the grooves are parallel to the plane of said one rigid plate but perpendicular to the shift force.

6. The capacitive shift-force sensor according to claim 4, wherein said one rigid plate has a plane parallel to the shift force and wherein the grooves are parallel to the plane of said one rigid plate but perpendicular to the shift force.

7. The capacitive shift-force sensor according to claim 1, wherein the capacitive shift-force sensor is a part of a material tester for testing a material sample, the material tester having a reciprocating part and a probe that performs reciprocating motions relative to the material sample and in contact therewith, the capacitive shift-force sensor being installed between the reciprocating part and the probe.

8. A force-measurement sensor comprising:
a casing comprising a first plate and a second plate spaced from each other, oriented parallel to each other, and interconnected by deformable members that allow plane-parallel displacement of the first plate and the second plate relative to each other when a shift force is applied to one of the first plate and a second plate;
a first capacitor having first capacitive characteristics and comprising a first pair of capacitor plates forming a first capacitor gap and a second capacitor having second capacitive characteristics and comprising a second pair of capacitor plates forming a second capacitor gap, wherein one capacitor plate of the first pair and one capacitor plate of the second pair are connected to the first plate of the casing and are arranged perpendicular thereto, and wherein the other capacitor plate of the first pair and the other capacitor plate of the second pair are connected to the second plate of the casing and are arranged perpendicular thereto so that when a shift force is applied to one of the plates of the casing, said one plate is displaced relative to the other plate due to interconnection through the deformable members, and the first capacitor gap and the second capacitor gap change differently thus causing changes in capacitive characteristics of the first capacitor and the second capacitor depending on the force applied to said one of the plates of the casing, each deformable member comprising a member of a predetermined thickness which has two thinned portions, one thinned portion being located on the side of the deformable member close to one rigid plate and another thinned portion being formed on the side of the deformable member close to the other rigid plate, the thinned portions imparting to said casing deformability and allowing plane-parallel motions of said one rigid plate to the other rigid plate.

9. The capacitive shift-force sensor according to claim 8, wherein each thinned portion comprises two groove formed opposite to each other on opposite sides of the deformable member.

10. The capacitive shift-force sensor according to claim 9, wherein the grooves have directions that allow plane-parallel movement of one rigid plate relative to the other rigid plate when a shift force is applied to said one rigid plate.

11. The capacitive shift-force sensor according to claim 10, wherein said one rigid plate has a plane parallel to the shift force and wherein the grooves are parallel to the plane of said one rigid plate but perpendicular to the shift force and wherein each capacitor is connected in series with an electric circuitry containing an AC power generator and a resistor.

12. The capacitive shift-force sensor according to claim 8, wherein the capacitive shift-force sensor is a part of a material tester for testing a material sample, the tester having a reciprocating part and a probe that performs reciprocating motions relative to the material sample and in contact therewith, the capacitive shift-force sensor being installed between the reciprocating part and the probe.

13. The capacitive shift-force sensor according to claim 9, wherein the deformable member is made from a material that provides deformation of the deformable member within the Hooke's law, and the shift force is selected within the range that causes deformation of the deformable member within the Hooke's law.

14. The capacitive shift-force sensor according to claim 11, wherein the deformable member is made from a material that provides deformation of the deformable member within the Hooke's law, and the shift force is selected within the range that causes deformation of the deformable member within the Hooke's law.

15. The capacitive shift-force sensor according to claim 10, wherein said one rigid plate has a plane parallel to the shift force and wherein the grooves are parallel to the plane of said one rigid plate but perpendicular to the shift force and wherein each capacitor is a part of a circuitry that comprises an AC power generator of a variable frequency for operating of the circuitry in a resonance mode.

* * * * *